United States Patent Office 3,029,385
Patented Apr. 10, 1962

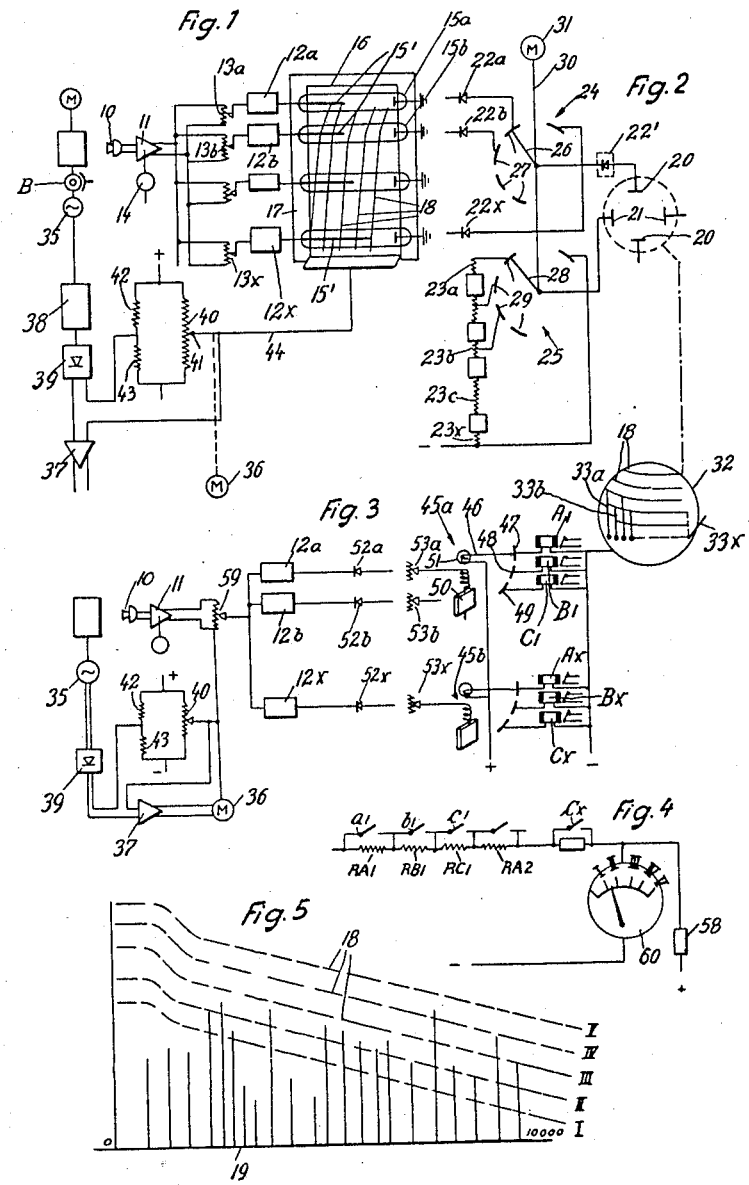

3,029,385
APPARATUS FOR ANALYZING NOISE
PRODUCED BY MACHINES
Hans Steinbrenner, Stuttgart, and Erwin Müller, Stuttgart-Sillenbuch, Germany, assignors to Daimler-Benz Aktiengesellschaft, Stuttgart-Unterturkheim, Germany
Filed June 8, 1959, Ser. No. 818,754
Claims priority, application Germany June 6, 1958
2 Claims. (Cl. 324—77)

Our invention relates to an apparatus for analyzing noise produced by a machine, particularly by the speed change transmission of a motor vehicle.

In the manufacture of speed change transmissions for motor vehicles and of other machines it is desirable to test the products with respect to their acoustic qualities for their classification in dependence on the noise which they produce in operation and, more particularly, for the segregation of transmissions or other machines that are noisy in operation from those that operate in a smooth manner. Heretofore, it was common practice to perform such tests by audition only. As the results of such tests rely entirely on the auditory subjective qualifications of the person or persons performing the tests and as such qualifications are greatly influenced by physical and psychic conditions, such as fatigue, the results of such tests are not satisfactory.

It is the object of our invention to provide an apparatus for testing the noise produced by machines, particularly by speed change transmissions of motor vehicles, in an objective manner substantially eliminating the human factor and producing a satisfactory and reliable result.

Further objects of our invention are to provide an apparatus for analyzing noise produced by a machine by measuring the loudness of the different tones of which the noise is composed and by evaluating the total acoustic effect of such tones in view of their different loudness.

Our invention is based on the fact that it is not the total volume or loudness of the entire sound produced by the machine to be tested which should be taken in consideration in an adjudgment of the acoustic quality of the machine, but it is rather the pitch and volume of individual tones that renders a noise more or less objectionable. Moreover, the differences of the noises produced by different transmissions of the same design are so slight, as a rule, that they can be detected only by an analysis in which the total sound is subdivided in different frequency bands each of which is measured with respect to its volume. In the absence of such analysis it is not possible to obtain reliable results affording a possibility of comparing different transmissions of the same design with respect to their acoustic qualities.

Therefore, it is the primary object of our invention to provide an improved apparatus for analyzing and evaluating the noise produced by machines in operation.

Further objects of our invention will appear from a detailed description of a number of embodiments illustrated in the accompanying drawings. It is to be understood, however, that our invention is in no way limited to the details of such embodiments but is capable of numerous modifications within the scope of the appended claims and that the terms and phrases used in such detailed description following hereinafter have been chosen for the purpose of explaining the invention rather than that of restricting or limiting the same.

In the drawings—

FIG. 1 is a circuit diagram of our novel apparatus for analyzing noise in which the indicators for the indication of the volumes of the different frequency bands are glow discharge tubes and in which the evaluating means for the evaluation of the indications is a chart, FIG. 2 illustrates a modification of the apparatus shown in FIG. 1 in which the means for indicating the volumes of the different frequency bands is a cathode ray tube, FIGS. 3 and 4 show a modification of the apparatus shown in FIG. 1 in which the indicators indicating the volumes of the different frequency bands include selector switches, the evaluating means cooperating therewith comprising summing means for combining the individual indications and controlling a sum indicator for the representation of the sum of the indications, and FIG. 5 represents the chart shown in FIG. 1 on an enlarged scale.

In FIG. 1 A indicates the machine to be tested, for instance a speed change transmission of a motor vehicle having an input shaft connected to a motor M and an output shaft on which a brake B is mounted affording a possibility of testing the transmission under various conditions of operation, more particularly under different loads and at different speeds.

A microphone 10 which may be an air microphone or a body sound microphone is coordinated to the speed change transmission A so as to receive the noise produced thereby in operation. An amplifier 11 has its input connected to the microphone 10 and each of a plurality of bandpass filters 12a, 12b, etc. is connected to the output of the amplifier 11 through the intermediary of suitable attenuating means, such as potentiometers 13a, 13b, etc. Preferably, the amplifier 11 is provided with means for indicating the amplitude of the output voltage and with adjusting means 14 for the calibration of the amplifier.

Preferably, the bandpass filters 12 are so dimensioned that the narrow frequency bands passing therethrough cover the entire range of audible sound. As bandpass filters are well known in the art, a detailed description thereof may be dispensed with. It will suffice to state that each filter affords passage to a narrow frequency band. The widths of the individual frequency bands may be chosen in dependence on the characteristics of the noise to be analyzed. Preferably, the bands of a frequency which borders the upper limit frequency or the lower limit frequency of the frequency range of audible sound is rendered more wide than the bands of medium frequencies within the audible range. No matter, however, how wide any particular frequency band may be chosen, the width thereof must be such that the output energy is in excess of the minimum energy to which the indicating means to be described hereinafter is capable of responding.

In the embodiment illustrated in FIG. 1 the indicating means connected and responsive to the bandpass filters for the indication of the amplitudes of the various frequency bands is formed by a plurality of indicators or electro-responsive devices individually connected to the bandpass filters, each of said indicators comprising a glow discharge tube 15a, 15b, etc. Each of these glow discharge tubes has an elongated glass vessel, in which the length of the glow discharge is indicative of the voltage applied, such voltage depending on the output energy of the respective bandpass filter or, in other words, on the sound level of the particular frequency. In order to enable the operator to simultaneously evaluate the noise quality represented by the glow discharge columns 15', we have provided evaluating means which are coordinated and responsive to all of the indicators, such as 15a, 15b, etc. In the embodiment shown in FIG. 1 the evaluating means is formed by a chart 16 comprising a transparent sheet carried by a rigid frame 17. This chart which is more fully shown in FIGURE 5 has curves 18 above a common abscissa 19 (FIG. 5), the ordinates of such curves representing standard amplitude values for comparison with the indicated amplitudes of the sound components. The lowest curve I in FIG. 5 represents amplitude values indicative of a high quality of the transmission being tested. Therefore, the transmission will pass the test as having the high acoustic quality number I, if none of the discharge columns 15' will extend beyond the lowest curve 18 in FIG. 1 is the leftmost curve. If the acoustic quality of the transmission A is extremely poor, one or some of the discharge columns 15' may extend to the rightmost curve V in FIGS. 1 or 5. Hence, a comparison of the discharge columns 15' with the chart yields a reliable evaluation of the noise quality of the transmission.

The curves may be drawn on the basis of empirical tests made with a large number of transmissions. Alternatively, the curves may be computed and based on the degree to which sounds of different frequencies and intensities are objectionable or unpleasant.

The operation of the apparatus shown in FIG. 1 is as follows: The noise produced by the transmission A is received by the microphone 10 and the output of the microphone is amplified by the amplifier 11 and fed into the potentiometers 13. Each potentiometer is so adjusted as to pass a certain fraction of the output voltage to the associated bandpass filter 12. The number of these filters depends on the composition of the sound. Where the sound includes individual tones of a high intensity, narrow bands are preferably chosen for the analysis of such tones. Where the noise is more or less uniform, a smaller number of filters will suffice.

The characteristic of the amplifier 11 may be linear or logarithmic to thereby introduce any desired scale. An amplifier 8 having a logarithmic characteristic will yield an output voltage which when expressed in volt is indicative of the intensity of the sound measured in decibel or phon. The potentiometers 13 serve the purpose of adjusting all of the glow tubes to the same sound level. If desired, however, the potentiometers 13 may be omitted.

Alternatively, the curves on the chart 16 may be replaced by substantially straight and parallel lines and the potentiometers 13 may be so adjusted that the glow discharge columns will conform to these lines. In that event, however, a single auditory evaluation may be set up, whereas the use of the "unpleasantness-curves" shown in FIG. 5 permits the provision of different curves for different sound intensities.

In the embodiment illustrated in FIG. 2, the indicating means connected and responsive to the bandpass filters for the indication of the amplitudes of the frequency bands comprises a single cathode ray tube having two pairs of opposite control plates referred to hereinafter as the vertical pair 20 and the horizontal pair 21. The apparatus further comprises rectifiers 22 which are individually coordinated to and connected with the bandpass filters 12a, 12b, etc. shown in FIG. 1. For this reason, the bandpass filters, the amplifier and the microphone are not shown in FIG. 2. Moreover, we have provided a plurality of sources 23a, 23b, etc. of different control voltages which may be resistors disposed in series between the terminals of a source of direct voltage. Suitable switching means, such as a pair of rotary selector switches 24 and 25 with means for coupling these switches for synchronous rotary movement are connected to the control plates 20, 21, to the rectifiers 22 and to the sources 23 for connecting the pair 20 of control plates successively to the rectified filter outputs, and for connecting the pair 21 of control plates successively to the sources 23 in a progressive sense.

Each switch 24 includes a rotary switch arm 26 and a plurality of circumferentially distributed contacts 27 each of which is connected to the output of one of the rectifiers 22. The selector switch 25 includes a rotary arm 28 and a plurality of circumferentially distributed contacts 29 cooperating therewith, each contact 29 being connected to one of the voltage sources 23. The rotary arms 26 and 28 are fixed to a common shaft 30 coupled to a motor 31 performing at least 25 revolutions per second. The screen of the cathode ray tube whose cathode beam is deflected by the voltages applied to the pairs of control plates 20 and 21 in the conventional manner is illustrated at 32.

The operation of the apparatus illustrated in FIG. 2 is as follows: The siwtch arm 26 will apply the rectified output voltages representative of the various intensities of the sound frequency bands successively to the control plates 20. During the interval in which the output voltage from rectifier 22a is applied to the vertical control plates 20, the horizontal control plates 21 are connected to the source of voltage 23a which is the highest voltage diverting the beam to the utmost left on the screen 32. Under the effect of the fluctuating voltage applied to the plates 20, the beam oscillates up and down, thus producing a light column 33a the length of which is indicative of the intensity of the sound frequency band represented by the current passing through filter 12a. The column 33a lights up once during every revolution of shaft 30 and, therefore, 25 times per second thus appearing to the human eye as a light strip of substantially uniform intensity. When the control plates 20 are connected by the switch arm 26 with the rectifier 22b, the horizontal control plates 21 are connected to the source 23b of lower voltage diverting the cathode ray beam to a lesser extent, thus creating the light column 33b which is spaced from the light column 33a and has a length indicative of the intensity of the frequency band passing through filter 12b.

In a similar manner, the intensities of all of the other sound frequency bands are represented on the screen 32 by light columns disposed in a similar manner as the discharge columns of the glow tubes shown in FIG. 1. A transparent chart, such as chart 16 in FIG. 1, is placed on the screen 32, such chart being provided with the curves 18 illustrated in FIG. 2. This chart represents an evaluating means enabling the operator to compare the amplitudes indicated on the screen 32 by the light columns 33a, 33b, etc. with the standard amplitude values represented by the curves 18.

The apparatus illustrated in FIG. 2 is more compact than that shown in FIG. 1 and the indication is very stable.

The evaluation of the sound quality of the transmission by means of the chart forming part of the apparatus shown in FIG. 1 and FIG. 2 may be carried out as follows: After the motor M has been adjusted to the desired speed of operation, the operator must count the number of light columns 15' or 33 which exceed a certain curve and he may then give a mark, such as "good," "satisfactory," "sufficient," "poor," and "very poor," using certain rules requiring, for instance, that a transmission having mark number I must not produce more than six sound frequency bands exceeding the lowest curve number I and that the mark number II will be given transmissions producing 6–8 sound frequency bands exceeding curve II etc.

The apparatus illustrated in FIG. 1 and that shown in FIG. 2 so far as described hereinabove are perfectly satisfactory, where the machine A to be tested is operated in practice at a single predetermined speed only. In that event, the motor M is adjusted to that particular speed. Transmissions of motor vehicles, however, which are operated at different speeds varying within a wide range must be tested at different speeds. As the average noise level, however, increases with an increasing speed, it is necessary in the evaluation of the indication to take the speed of rotation of the transmission A in consideration. That may be done by adjusting the chart 16 in the direction of its abscissa 19 relative to the indicating means. Preferably, for the purpose of an automatic adjustment of the chart, the apparatus is equipped with speed-responsive means, such as a tachometer generator 35 connected to the output shaft of the transmission A, to produce a signal indicative of the speed of the machine and is further equipped with a positional servo-motor connected to the speed-responsive means to produce a position representative of the speed. In the embodiment shown this servo-motor is a conventional direct current position servo-motor 36 fed by the direct current servo-amplifier 37 whose input is controlled by the tachometer generator 35 via a network 38 and a rectifier 39. A feedback is effected in the conventional manner by means of a bridge circuit comprising a potentiometer 40, whose sliding contact 41 is adjustable by the servo-motor 36, and a pair of resistors 42 and 43 connected in series and supplied with a direct voltage from the same source to which the potentiometer 40 is connected. This bridge circuit is interposed between the rectifier 39 and the input of the servo-amplifier 37.

The frame 17 of the chart 16 is guided in suitable guiding means not shown to be movable transversely to the light columns 15', FIG. 1, or 33, FIG. 2, respectively. Suitable adjusting means for moving the frame 17, such as a threaded spindle, are coupled with the servo-motor 36 as diagrammatically indicated by the line 44.

Therefore, the chart 14 bearing the "unpleasantness" curves 18 is movable transversely to the indicating light columns 15' or 33. This will render these curves applicable to tests of the transmission A at different speeds because lower speeds generally result in lower noise than higher speeds. By means of the network 38 or by selecting a tachometer generator 35 of a proper characteristic, any desired relationship may be provided between the rotary speed of the machine being tested and the displacement of the chart 16. This relationship may be a linear or a logarithmic or any desired other relationship conforming to the dependency of the volume of the noise produced upon the speed of rotation of the machine A.

It is a particular advantage of the apparatus shown in FIG. 1 or that shown in FIG. 2 that the person testing the transmission A may easily survey the composition of the noise produced and may then apply any desired rule for the evaluation thereof.

The apparatus described hereinabove with reference to FIG. 2 may be modified by an elimination of the plurality of rectifiers 22a—22x and by the substitution of a single rectifier indicated at 22' which is inserted between the switch arm 26 and the pair of plates 20.

In the apparatus illustrated in FIGS. 3 and 4 the evaluating means comprises summing means connected to the indicators for combining the indications thereof and a sum indicator responsive to the output of said summing means for the representation of the sum of said indications of the narrow frequency bands. More particularly, each of the indicators includes a selector switch 45a, 45b, etc. Each of these selector switches comprises a rotary arm 46 adapted to make contacts with one of a plurality of contacts 47, 48 and 49. The selector arm 46 is controlled by a rotary coil 50 and a spiral spring 51 in such a manner as to be angularly displaced in proportion to the current supplied to the rotary coil 50 by the bandpass filter 12 via a rectifier 52 and suitable attenuating means, such as a potentiometer 53.

Each of the contacts 47, 48, 49 is connected to the coil of a relay, these relays bearing the reference characters A1, B1 and C1, each relay having an associated normally open contact $a1$, $b1$ or $c1$ respectively.

In the embodiment shown in FIG. 3, a group of three relays is thus coordinated to each selector switch 45 and the selection from this group of one of the relays depends upon the intensity of the sound frequency band passing through the particular filter 12.

The summing means connected to these electro-responsive selector switch devices 45a, 45b, etc., for combining the indications of the filter outputs, comprises resistor means controlled by the contacts of the relays selected from the various groups for establishing a circuit having a resistance commensurate with the sum of the energies of the frequency bands. In the apparatus illustrated in FIGS. 3 and 4 this resistor means comprises as many resistors as relay contacts are provided. Therefore, where the number of bandpass filters amounts to ten and where each group of relays comprises three relays, thirty resistors are provided. These resistors bearing the reference numerals RA1, RB1, RC1, RA2, RB2, RC2, etc. are connected in series between the terminals of a direct voltage source. Each resistor is so connected with its associated relay contact $a1$, $b1$, $c1$, $a2$, $b2$, etc. that it may be short-circuited thereby. The resistor RB1 has a larger resistance than the resistor RA1 and the resistor RC1 has a larger resistance than the resistor RB1. Similarly, the resistor RB2 is larger than the resistor RA2 and the resistor RC2 is larger than the resistor RB2. Therefore, the current flowing through the resistors represents substantially the sum of the intensities of the various sound frequency bands because a low intensity will energize the relay A and thus short circuit a resistor of a low resistance only, whereas a very powerful intensity of any sound frequency band will cause the associated indicator 45 to energize the relay C thereof causing the short circuiting of a resistor of very high resistance, thus increasing the current considerably.

The current flowing through the series of resistors is measured by an instrument 60 indicating directly the quality class of the transmission tested.

In this embodiment the positional servo-motor 36 is coupled with an attenuating element, such as a potentiometer 59, controlling the output of the amplifier 11 so as to attenuate the amplifier output supplied to the bandpass filters to a degree commensurate with the speed of operation of the transmission A being tested.

The zero current flowing when all of the relay switches A1, B1, C1, etc. are open, may be suppressed by suitable compensating means diagrammatically indicated at 58.

Hence, it will appear that the apparatus illustrated in FIGS. 3 and 4 will fully automatically evaluate the analysis of the sound by summing up the intensities of the individual frequency bands. The instrument 60 may be so calibrated as to directly indicate the quality mark I, II, III, IV or V indicative of the acoustic quality of the transmission A tested.

While in the embodiment described hereinabove each group of relays includes three relays, the number thereof may be chosen so as to suit the requirements of any particular case.

Preferably, the rectifiers 52a, 52b, etc. have a logarithmic characteristic in conformity with the definition of the sound intensity by decibel or phon. The potentiometers 53a, 53b, etc. are individually adjusted in dependency on the degree of unpleasantness of the particular frequency band. Hence, the potentiometers 53 of such noise components as are deemed particularly unpleasant are so adjusted as to yield a higher output than other potentiometers coordinated to frequency bands of noise components that are less unpleasant. It will be readily appreciated, that electronic selectors may be substituted for the selector switches 45, if desired. The desired dependency upon the volume of the sound unless taken in consideration already by an appropriate amplitude characteristic may be attained by rendering the resistors RA1, RB1 different, for instance $R_B = R_A$, $R_C = 3R_A$ etc. Where electronic circuits are employed, for instance trigger circuits or the like, the resistances must be equal as in this event the apparatus also responds to the lower sound volumes, thus yielding the desired evaluation of the sound volume automatically. This will ensure that the current supplied to the indicator 60 and thus the deflection of the hand of the instrument 60 is indicative of the acoustic quality tested.

The adjustment of the apparatus is effected empirically in such a manner that from a series of machines some machines having certain acoustic qualities are picked out and are analyzed, the apparatus being so adjusted that the instrument 60 will indicate the order of the acoustic quality.

The speed of the transmission to be tested is gradually increased and decreased and in this operation the instrument 60 is being watched. Preferably, the transmission A may be reversed so that its output shaft will be driven by the motor and its input shaft will be braked by the brake B so as to simulate the condition of coasting of the vehicle. The highest deflection of the hand of the instrument 60 is noted and represents the mark indicative of the acoustic quality of the transmission. If desired, the indication of the instrument 60 may be recorded on a card by a suitable printing or punching instrument. In this manner, the test results obtained at a plurality of speeds may be recorded so that subsequently an exact comparison is rendered possible. Where a plurality of different designs of transmissions or other machines must be tested, the evaluation of the composition of the sound and of the volume of the sound will generally remain invariable. Therefore, it will not be necessary to change the adjustment of the apparatus. Such adjustment may become necessary, however, where the distance of the microphone 10 from the machine to be tested varies. This adjustment may be effected by adjusting the magnifier 11 or by adjusting the voltage applied to the series of resistors $R_{A1}$, $R_{B1}$, $R_{C1}$, $R_{A2}$, etc. Hence, the apparatus of my invention affords a possibility of testing all similar transmissions successively produced in mass production irrespective of the quantities thereof. The testing result will be the more accurate the higher the number of frequency bands is chosen.

In each of the illustrated embodiments, the noise quality of the apparatus being tested is evaluated at a single indicating station such as at the chart 16 in FIGURE 1, on the cathode ray tube screen 32 as in FIGURE 2 or at the instrument 60 associated with the embodiments of FIGURES 3 and 4. It is noted, however, that in each of FIGURES 1 and 3 there are separate electro-responsive devices connected to the outputs of the respective bandpass filters 12.

It depends on the nature of the testing place whether an air microphone or a body sound microphone should be preferred. Where a good sound insulation is provided between the motor M and the transmission A a body sound microphone may yield better results. Where a reflection of sound from the walls of the testing room must be counted with, an air sound microphone appears preferable. In that event, however, the person performing the test should be careful not to produce any noise himself. A body sound microphone, on the other hand, is less sensitive to outside noise.

From the above description of a number of embodiments of our invention it will appear that our novel apparatus receives the entire noise of the machine to be tested by means of an air sound microphone or of a body sound microphone, delivers the noise received via an amplifier to a predetermined number of individual bandpass filters which sift small frequency bands out of the entire noise, the amplitudes of the noise components passing through the individual filters being either visibly indicated and compared with a standard noise level corresponding to the human audition curve or to other curves developed, for instance, on the basis of tests and computations or on the basis of the particular problem (unpleasantness-curves). The number of amplitudes exceeding the respective curves may be added or the addition may be effected by summing means, the sum being indicated directly.

From the foregoing it will be seen that this invention is one well adapted to attain all of the ends and objects hereinabove set forth, together with other advantages which are obvious and which are inherent to the apparatus.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. Apparatus for analyzing noise produced by a machine comprising a microphone mounted to receive said noise, amplifying means having an input connected to said microphone and an output, a plurality of bandpass filters for different frequencies, each filter being connected to said output and being constructed to afford passage to a narrow frequency band, indicating means connected and responsive to said bandpass filters for the indication of the amplitudes of said narrow frequency bands, evaluating means coordinated and responsive to all of said indicators for evaluating the noise quality of said apparatus, speed-responsive means connected to said machine to produce a signal indicative of the speed of said machine, a positional servo-motor connected to said speed-responsive means to produce a position representative of said speed, and adjustable attenuating means connected to said servo-motor for adjustment thereby and coordinated to said indicating means for progressively attenuating the indication thereof, as the speed of said engine increases.

2. Apparatus for analyzing noise produced by a machine comprising a microphone mounted to receive said noise, amplifying means having an input connected to said microphone and an output, a plurality of bandpass filters for different frequencies, each filter being connected to said output and being constructed to afford passage to a narrow frequency band, indicating means connected and responsive to said bandpass filters for the indication of the amplitudes of said narrow frequency bands, evaluating means coordinated and responsive to all of said indicators for evaluating the noise quality of said apparatus, and including a chart extending across said indicating means and having curves above a common abscissa, said curves having ordinates representing said standard amplitude values for comparison with said indicated amplitudes, said chart being adjustable in the direction of said abscissa, said apparatus further comprising speed-responsive means connected to said machine to produce a signal indicative of the speed of said machine, a positional servo-motor connected to said speed-responsive means to produce a position representative of said speed, and means for coupling said servo-motor to said chart for adjustment of the latter in response to said speed.

References Cited in the file of this patent

UNITED STATES PATENTS

| | | |
|---|---|---|
| 1,753,330 | Bragg | Apr. 8, 1930 |
| 2,062,174 | Haskins et al. | Nov. 24, 1936 |
| 2,159,790 | Freystedt et al. | May 23, 1939 |
| 2,626,981 | Shiepe | Jan. 27, 1953 |

(Other references on following page)

UNITED STATES PATENTS

| | | | |
|---|---|---|---|
| 2,705,742 | Miller | Apr. 5, | 1955 |
| 2,760,369 | Vanator | Aug. 28, | 1956 |
| 2,782,366 | Wall | Feb. 19, | 1957 |
| 2,817,815 | Evans | Dec. 24, | 1957 |
| 2,851,661 | Buland | Sept. 9, | 1958 |
| 2,901,697 | Smith | Aug. 25, | 1959 |
| 2,904,682 | Rawlins | Sept. 15, | 1959 |
| 2,967,998 | Hurvitz | Jan. 10, | 1961 |

FOREIGN PATENTS

| | | | |
|---|---|---|---|
| 594,674 | Great Britain | Nov. 17, | 1947 |
| 967,490 | France | Mar. 29, | 1950 |
| 959,931 | Germany | Mar. 14, | 1957 |

OTHER REFERENCES

"An Octave Band Analyzer for Noise Measurements," The General Radio Experimenter, vol. XXVI, No. 4, September 1951.

"A Multichannel Noise Spectrum Analyzer for 10–10,000 Cycles," article in the Review of Scientific Instruments, September 1954, pages 899–901.